United States Patent
Sakraschinsky et al.

(10) Patent No.: US 6,695,966 B1
(45) Date of Patent: Feb. 24, 2004

(54) FILTER ELEMENT PROVIDED WITH AN ASCENDING PIPE

(75) Inventors: Michael Sakraschinsky, St. Ingbert (DE); Stefan Hennes, Hangard (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 0 days.

(21) Appl. No.: 09/980,229

(22) PCT Filed: Oct. 20, 2000

(86) PCT No.: PCT/EP00/10334

§ 371 (c)(1),
(2), (4) Date: Nov. 29, 2001

(87) PCT Pub. No.: WO01/28654

PCT Pub. Date: Apr. 26, 2001

(30) Foreign Application Priority Data

Oct. 22, 1999 (DE) .......................................... 199 50 913

(51) Int. Cl.[7] .......................... B01D 29/23; B01D 29/13
(52) U.S. Cl. ..................... 210/232; 210/450; 210/457; 210/493.2; 210/497.01
(58) Field of Search ................................ 210/232, 457, 210/450, 493.2, 497.01

(56) References Cited

U.S. PATENT DOCUMENTS

| 2,543,484 | A | * | 2/1951 | Wicks et al. |
| 3,498,464 | A | * | 3/1970 | Frosolone |
| 4,186,099 | A | * | 1/1980 | Henschel, Jr. et al. |
| 4,218,324 | A | | 8/1980 | Hartmann et al. |
| 5,211,846 | A | * | 5/1993 | Kott et al. |
| 5,250,179 | A | | 10/1993 | Spearman |
| 5,423,984 | A | * | 6/1995 | Belden |
| 5,476,585 | A | * | 12/1995 | Mills |
| 5,702,602 | A | * | 12/1997 | Brown et al. |
| 5,868,932 | A | | 2/1999 | Guichaoua et al. |
| 5,984,109 | A | | 11/1999 | Kanwar et al. |
| 6,096,207 | A | * | 8/2000 | Hoffman, Jr. et al. |

FOREIGN PATENT DOCUMENTS

| DE | 3341642 | | 7/1984 |
| EP | 0090383 | | 10/1983 |
| WO | 99/48591 | * | 9/1999 |

* cited by examiner

Primary Examiner—Thomas M. Lithgow
(74) Attorney, Agent, or Firm—Roylance, Abrams, Berdo & Goodman, LLP

(57) ABSTRACT

A filter element is provided with an ascending pipe and a filter material subject to soiling and is supported by a supporting pipe. The filter material is separable from the ascending pipe such that the multi-component ascending pipe can be reused and to reduce the weight of hazardous waste to be disposed of when the soiled filter material has been changed. The ascending pipe is provided at least on one of its ends with a reception for the filter material in such a manner that the filter material with the supporting pipe as one assembly (22) and with the ascending pipe (10) as another component are detachable coupled, allowing the exchange of the soiled filter material by new filter material while keeping the ascending pipe. The filter element can be assembled during production with less effort, thereby allowing for a reduction of costs.

12 Claims, 2 Drawing Sheets

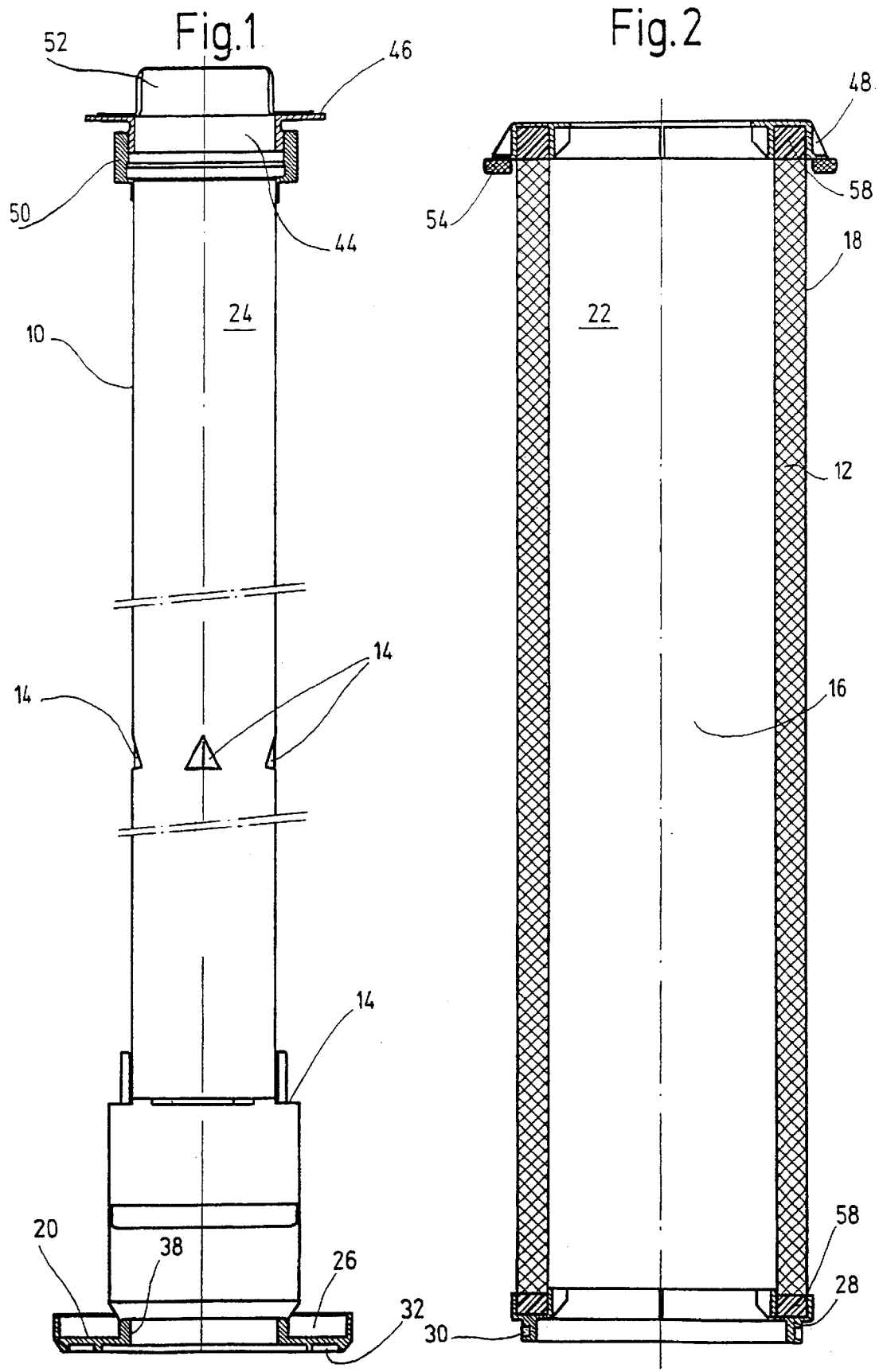

FILTER ELEMENT PROVIDED WITH AN ASCENDING PIPE

FIELD OF THE INVENTION

The present invention relates to a filter element with an ascending pipe and to a filter material surrounding the ascending pipe, arranged to be subjected to becoming soiled. The filter is supported on a supporting pipe which is separate from the ascending pipe.

BACKGROUND OF THE INVENTION

In the known, commercially available solutions, the ascending pipe together with the filter material adjacent to the supporting pipe forms a one-part assembly. When the filter material becomes soiled, the entire filter element must be replaced, along with the valuable component parts of the ascending pipe. Since the valuable component parts of the ascending pipe have materials different from the respective filter material to be disposed of, problems arise concerning the recycling or disposal of parts involved in the conventional solutions. Since filter elements are to be replaced in frequent time cycles when filter materials become soiled, the quantity of waste is relatively large and of great weight, all of which is to be handled with the waste disposal. Furthermore, with the conventional solutions the filter material is frequently welded together with the ascending pipe, which in manufacturing technology is expensive and cost-intensive.

DE-A-44 09 070 discloses supporting bodies for filter elements including a supporting pipe brought into contact with the filter material in the form of a filter mat. The supporting pipe for the flowthrough of a filtered medium is provided with a plurality of uniformly distributed peripherally arranged openings. Rigidification of the supporting pipe can additionally be provided on the interior periphery by a ring and rod construction, with the interior of the supporting pipe divided into individual fluid-carrying chambers. The filtration charge of the relevant filter element can be increased by virtue of the supporting pipe, since the filter element can be subjected to higher pressures during the flowthrough. The supporting pipe supports the filter material counter to the relevant flowthrough direction, and in that manner prevents buckling in and out of the filter material. Such solutions generally include no ascending pipe, which is present as an independent tubular structural part adjacent to the supporting pipe in the filter element according to the type of filter element in use. Such ascending pipes make passage available counter to the supporting pipes. The ascending pipe flow is through uniformly distributed openings in a high number comparable to a perforation, but is only through selected through-passage points, for example in the foot area of the ascending pipe, or in the longitudinal midpoint area of the ascending pipe which is being used. Otherwise, the ascending pipe has a closed, preferably cylindrical cover surface, which has the advantage that the fluid to be filtered can be collected first in the ascending pipe before it leaves the ascending pipe to pass through a filtration process, by flowing subsequently through the filter material with the supporting pipe. Detrimental pressure swings in the hydraulic system can be avoided by use of this type of ascending pipe. Particularly with the adjoining filtration, the assembly leads to uniform distribution and consequential uniform load on the pressure applications to the filter material with supporting pipe.

SUMMARY OF THE INVENTION

Objects of the present invention are to provide an improved filter element that can be easily disposable or recyclable, and that can be manufactured at low cost by a simple manufacturing method.

According to the present invention, the ascending pipe, on at least one of its ends, is provided with a receiving area to receive the filter material. A detachable connection between the filter material with supporting pipe is provided as one structural assembly. The ascending pipe is provided as a different structural assembly, while retaining the ascending pipe. This arrangement allows for exchange of the soiled filter material for a new filter material. The costly ascending pipe construction can be used again. The weight of the hazardous waste to be disposed of following the exchange of the then soiled filter material with supporting pipe is lowered. With construction of the filter element in detachable structural assemblies, the assembly outlay for the manufacture is reduced and consequently produces cost savings.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a partial front elevational view partially in section of an ascending pipe as one structural assembly according to an embodiment of the present invention;

FIG. 2 is a partial front elevational view in section of a filter material formed as another and separate structural assembly according to an embodiment of the present invention.

DETAILED DESCRIPTION OF THE INVENTION

Figure 3:
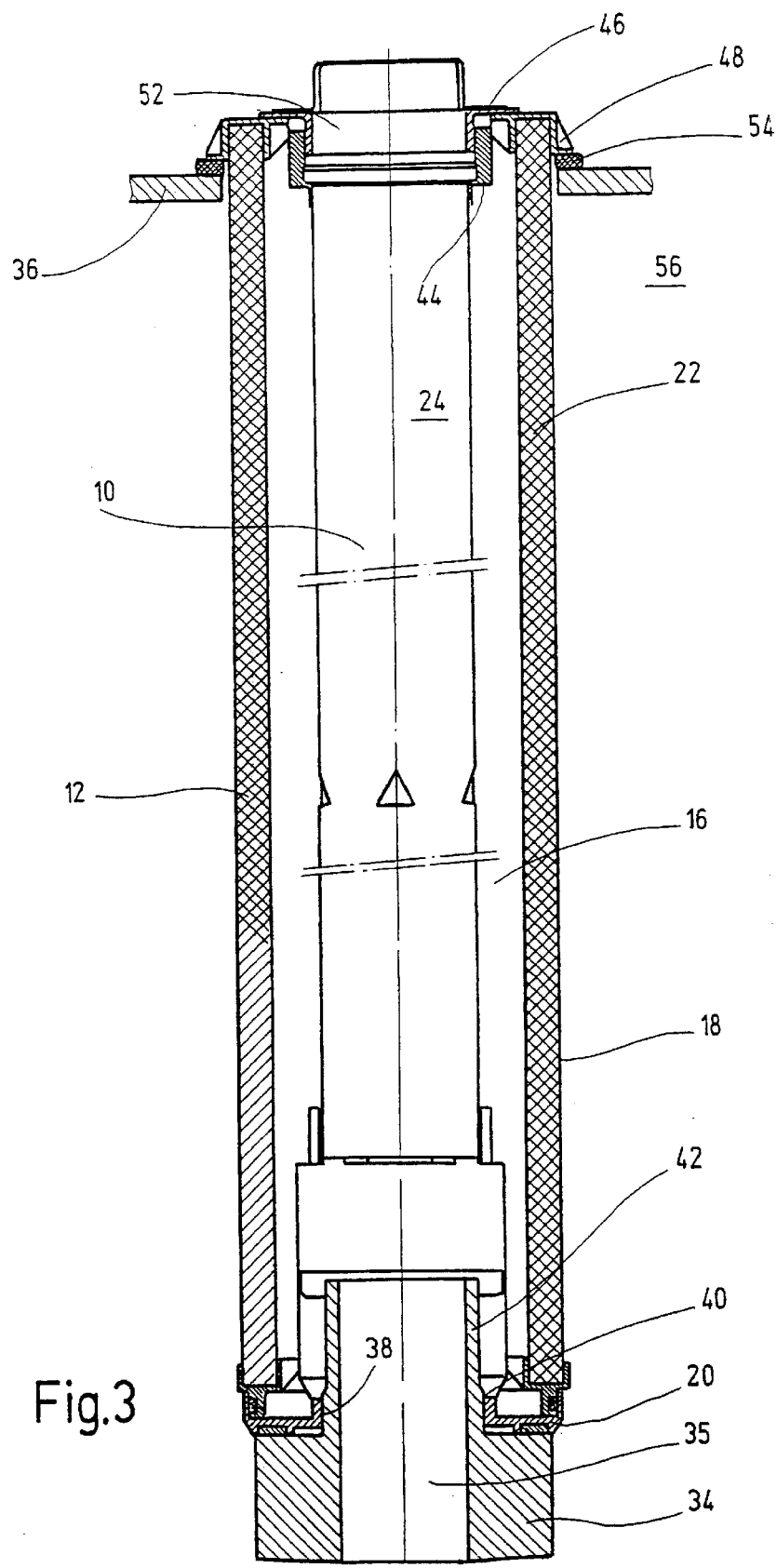
FIG. 3 is a partial front elevational view in section of an assembly of the ascending pipe of FIG. 1 and the filter material of FIG. 2.

The filter element, shown in the drawings, includes an ascending pipe 10 and a filter material 12 being subjected to soiling and surrounding the ascending pipe 10. Ascending pipe 10 forms essentially a hollow cylinder, into which is guided or conveyed the fluid to be filtered. Such fluid passes through openings 14 out of ascending pipe 10 and enters into the interior 16 of the filter element (FIG. 3). The fluid then flows from the interior to the exterior through the filter element, penetrating filter material 12. The contaminant particles in the fluid are filtered out through filter material 12 and remain in filter material 12.

To increase the pressure stability of filter material 12, a supporting pipe 18 can be built in a traditional structure around the filter material exterior periphery. Filter material 12 is configured as a sort of hollow cylinder. The resulting structuring of filter material 12 is described in the art of traditional filter elements, and therefore, is not to be described in greater detail herein.

As seen in the drawings, ascending pipe 10 has a receiving area 20 for filter material 12, at its bottom end. Preferably, the receiving area 20 is securely joined by welding to the metallic ascending pipe 10. As is clear from FIGS. 1 to 3, a detachable connection is provided between filter material 12 as one structural assembly 22 and ascending pipe 10 as a separate structural assembly. Ascending pipe 10 can be retained for further and repeated use as a valuable component, while the soiled filter material 12 is exchanged for new filter material 12. Filter material 12 is to be separated from ascending pipe 10.

Receiving area 20, represented at the bottom in the drawings, includes an annular recessed groove 26, into which filter material 12 is received with its sealing part 28 at the front and flush therewith. Sealing part 28 is provided on its exterior periphery with a sealing gasket 30 to form an exterior seal between filter material 12 and receiving area 20. Receiving area 20 also has an annular sealing gasket 32 at the front to form a seal at the housing parts 34 (FIG. 3) provided for securing the filter element. Housing parts 34, together with the other housing parts 36, form the partially represented border of a tank or the like, into which the filter element can be placed, as shown in FIG. 3.

Receiving area 20 is provided on its interior periphery with a threaded coupling 38, arranged to form the screw connection 40 with housing parts 34. For this purpose, housing parts 34 have a cylindrical hollow extension 42 adjacent to the filter element, with a stepped widening out, which forms the counter-threading for screw connection 40. The fluid flows in through the top opening of the filter element passing into the filter element. In the bottom opening 35 of the housing part, a spring-biased return valve can be provided, not to be described in greater detail herein, which renders operative a conventional bypass function when filter material 12 no longer allows passage of the fluid to be filtered because of the steadily progressing soiling of the filter material.

Ascending pipe 10 is provided with another receiving area 44 on its other end. Receiving area 44 incorporates a flange or widened-out area 46 with an end plate 48 for the frontal contact. The additional receiving area 44 of ascending pipe 10 is provided with a threaded segment 50 having an interior threading, into which is screwed or threaded a cap-like fixing member 52 for connecting filter material 12 with ascending pipe 10 by means of the fixing member exterior threading. Because of this screwing process, the axial spacing between flange-like widened-out area 46 and receiving area 20 can be varied as needed. Particularly such spacing can be narrowed insofar as filter element 12 is to be secured between these clamping points on ascending pipe 10.

End plate 48 of filter material 12 is widened out at its free end like a crosspiece or bar, and, in the direction of filter element 12, holds an annular sealing gasket 54. Gasket 54 engages, in the assembled arrangement (FIG. 3), on top of the additional top housing parts 36 and seals the exterior environment from the interior 56 limited by housing parts 34, 36, preferably in the form of the interior of a tank. Filter material 12 is connected securely with end plate 48, as well as with sealing part 28, by means of an adhesive connection 58, shown in FIG. 2 but deleted from FIG. 3 for improvement of the clarity of the drawing. Filter material 12 preferably is incinerable or recyclable materials, in order to simplify the disposal process.

For assembly of filter element 12, fixing part 52 is first removed from threaded segment 50 of ascending pipe 10. Filter material 12 can be exchanged, whereupon the soiled filter material 12 is withdrawn by pulling it from receiving area 20 of ascending pipe 10. The new filter material 12 is then secured therein by means of fixing part 52, with its flange or widened-out area 46 on ascending pipe 10. The composite assembly generated in this manner is fitted into the opening of housing part 36. The filter element is sealed onto housing part 36 by means of sealing gasket 54, which is biased by a not shown spring.

With the filter element according to the present invention, reuse of the constructively costly ascending pipe 10 is guaranteed. A notable lowering of the weight of hazardous waste to be disposed of following the exchange of filter material 12 is attained, since this remains simply to be separated and disposed of. As a result, simple manufacture of the filter element is attained using favorable manufacturing technology for this purpose. It has been proven as particularly advantageous to use the filter element of the present invention in hydraulic pumps and to connect these in series in fluid flow direction. A pressure valve can be present particularly within ascending pipe 10, which is not to be described in greater detail, allowing for increased pressure to be applied within the ascending pipe, for example in the range of from 0.5 to 1 bar. With reference to this pressure being produced, which can also be set even higher, and as a result of the partial supply of the volume of fluid to be filtered in the ascending pipe, the induction by suction into the hydraulic pump, not shown, is simplified. Also, a uniform volumetric filling level in relation to the supplied volume can be attained.

While one embodiment has been chosen to illustrate the invention, it will be understood by those skilled in the art that various changes and modifications can be made therein without departing from the scope of the invention as defined in the appended claims.

What is claimed is:

1. A filter element, comprising:
   a filter material subjectable to soiling and supported by a supporting pipe as a first structural assembly, said filter material having a first seating part with a first sealing gasket on an exterior periphery thereof;
   an ascending pipe formed as a second structural assembly separate form said first structural assembly and surrounded by said filter material, a first end of said ascending pipe having a first receiving area for said filter material, said ascending pipe extending along an entire length of said filter material and having outside openings;
   a detachable connection between said first and second structural assemblies permitting maintaining of said ascending pipe when a soiled filter material is exchanged for a new filter material, said detachable connection including in said first receiving area an annular recessed groove receiving said first sealing part, said first sealing gasket forming a seal with said first receiving area; and
   a second sealing gasket on a front side of said first receiving area for forming a seal with a housing part to which the filter element is attached.

2. A filter element according to claim 1 wherein said first receiving area comprises an internally threaded member for forming a screw connection with the housing part.

3. A filter element according to claim 1 wherein
   said ascending pipe comprises a second receiving area on an opposite second end thereof, said second receiving area having a laterally extending flange contacting an end plate on said filter material.

4. A filter element according to claim 3 wherein
   said second receiving area comprises a threaded segment on which a fixing part is threaded for connecting said filter material with said ascending pipe.

5. A filter element according to claim 4 wherein
   said end plate on said filter material comprises a sealing part on a free end thereof to seal an interior of the housing part from an outside environment.

6. A filter element according to claim 3 wherein
   said end plate on said filter material comprises a sealing part on a free end thereof to seal an interior of the housing part from an outside environment.

7. A filter element according to claim 6 wherein said end plate is securely connected to said filter material by an adhesive connection.

8. A filter element according to claim 5 wherein said end plate is securely connected to said filter material by an adhesive connection.

9. A filter element according to claim 1 wherein said supporting pipe is an exterior of said filter material.

10. A filter element according to claim 1 wherein said filter material is formed of incinerable or recyclable materials.

11. A filter element according to claim 1 wherein said outside openings are at axial ends of said ascending pipe, and are outside axial ends of said filter material.

12. A filter element according to claim 3 wherein said first and second receiving areas are outside of axial ends of said filter material.

* * * * *